Mar. 3, 1925.  
S. T. HOYT  
1,528,549  
METHOD OF AND APPARATUS FOR HANDLING AND TRANSPORTING FRUIT AND THE LIKE  
Filed July 17, 1923 4 Sheets-Sheet 1
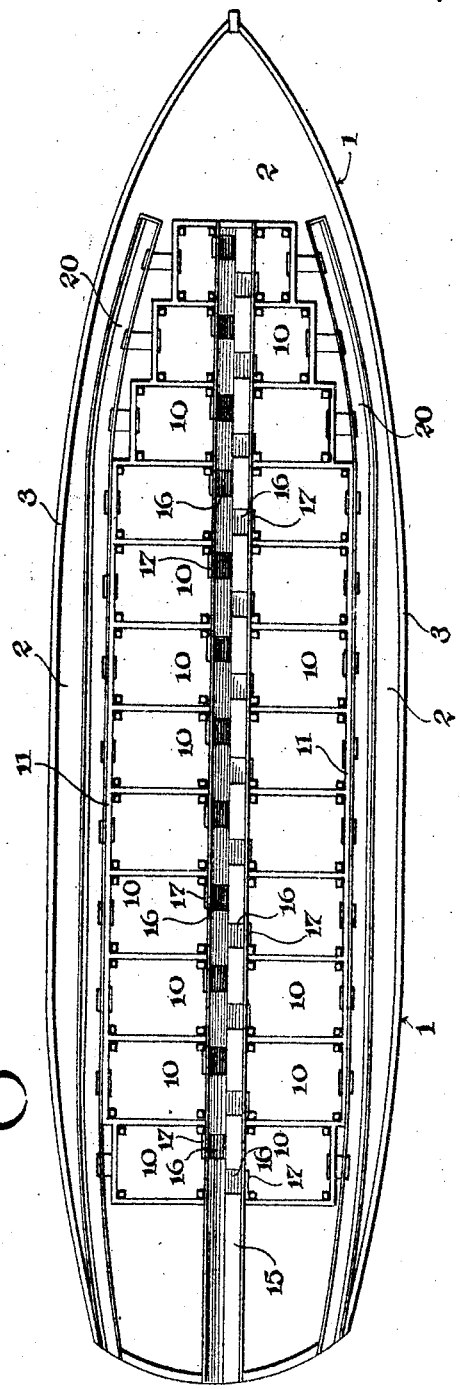
Inventor  
Simes T. Hoyt  
By O'Neill & Bunn  
Attorneys Mar. 3, 1925.  
S. T. HOYT  
1,528,549  
METHOD OF AND APPARATUS FOR HANDLING AND TRANSPORTING FRUIT AND THE LIKE  
Filed July 17, 1923  
4 Sheets-Sheet 2
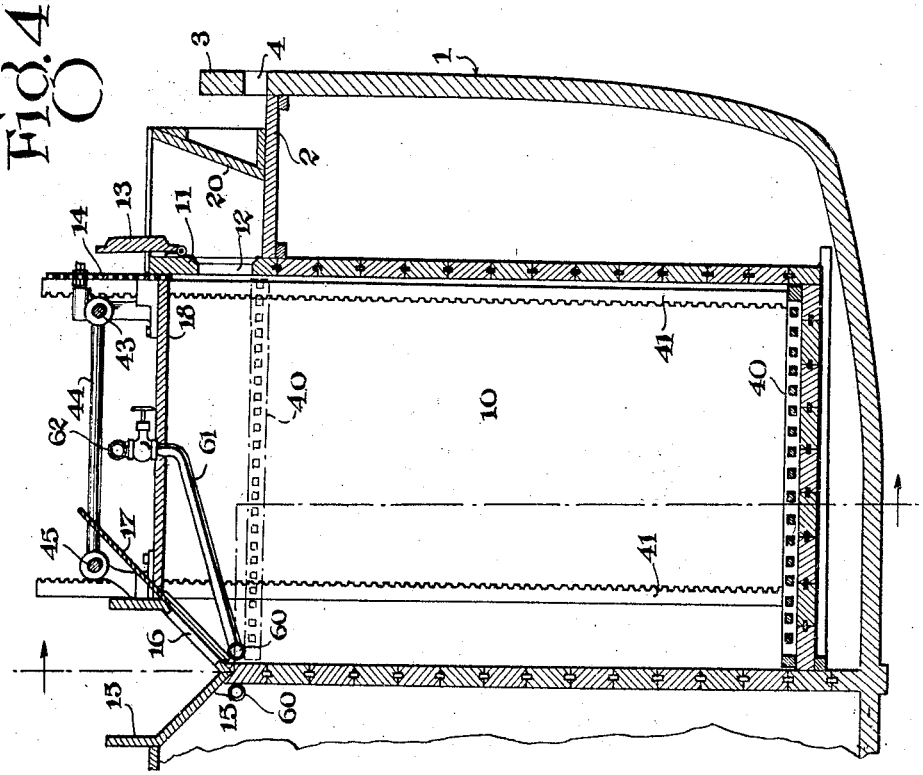
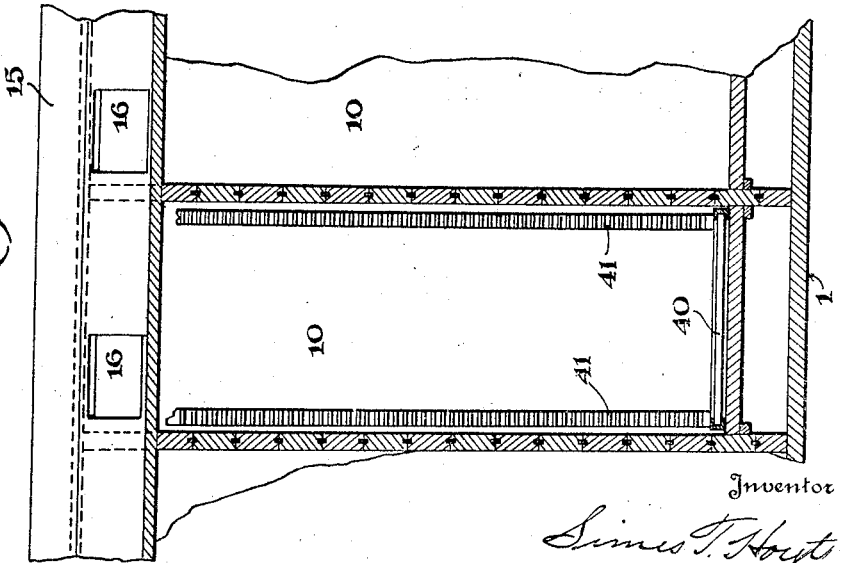
Inventor  
Simes T. Hoyt  
By  
Neill & Bunn  
Attorneys Mar. 3, 1925.
S. T. HOYT
1,528,549
METHOD OF AND APPARATUS FOR HANDLING AND TRANSPORTING FRUIT AND THE LIKE
Filed July 17, 1923   4 Sheets-Sheet 3
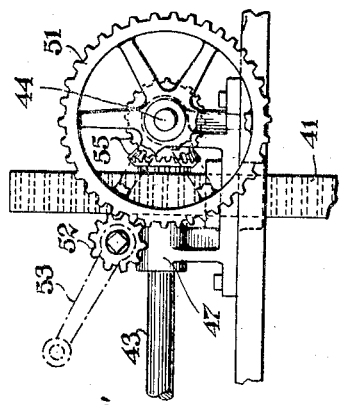
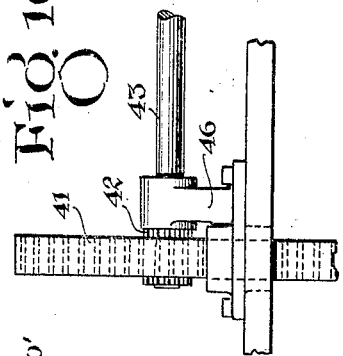
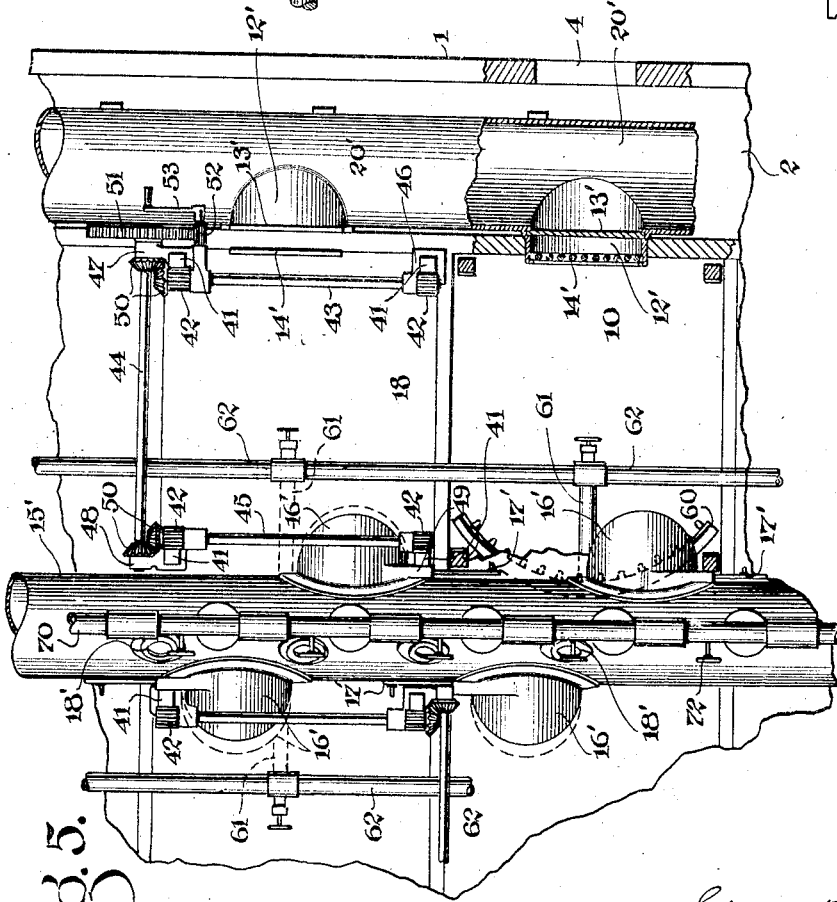
Inventor.
Simes T. Hoyt
By O'Neill & Bunn
Attorneys

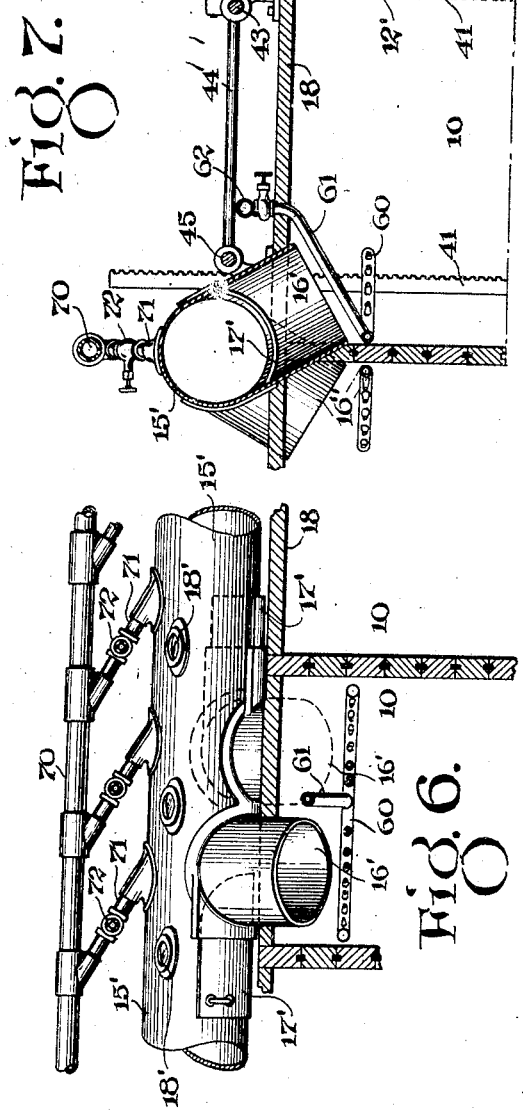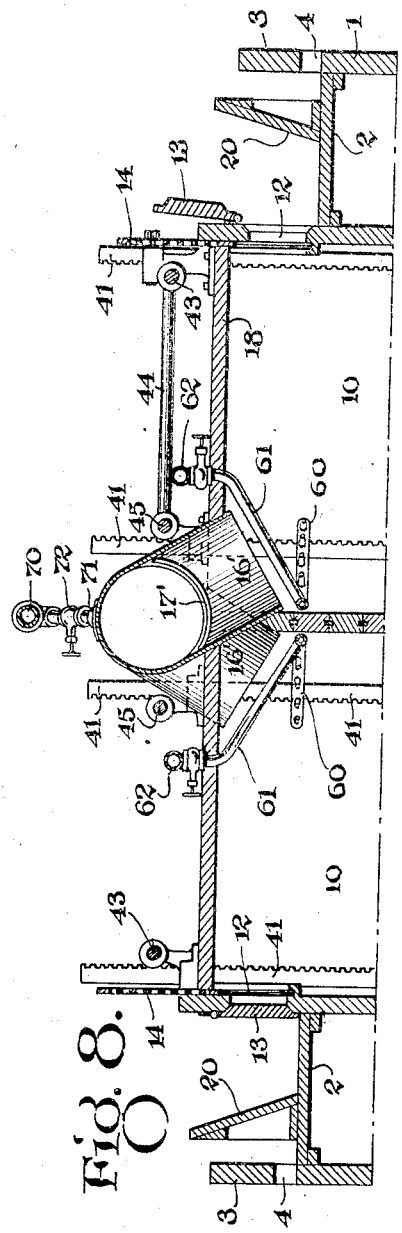

Patented Mar. 3, 1925.

1,528,549

UNITED STATES PATENT OFFICE.

SIMES T. HOYT, OF HONOLULU, TERRITORY OF HAWAII, ASSIGNOR TO HAWAIIAN PINEAPPLE COMPANY, LIMITED, OF HONOLULU, TERRITORY OF HAWAII, A CORPORATION OF HAWAII.

METHOD OF AND APPARATUS FOR HANDLING AND TRANSPORTING FRUIT AND THE LIKE.

Application filed July 17, 1923. Serial No. 652,140.

*To all whom it may concern:*

Be it known that I, SIMES T. HOYT, a citizen of the United States, residing at 2621 Puuni Avenue, city of Honolulu, Territory of Hawaii, have invented certain new and useful Improvements in Methods of and Apparatus for Handling and Transporting Fruit and the like; and I do hereby declare the following to be a full, clear, and exact description of the invention, such as will enable others skilled in the art to which it appertains, to make and use the same.

The invention relates to a method of and apparatus for handling and transporting fruit and similar articles or materials in bulk and has for its object to facilitate the loading, stowing, transporting, and unloading of the articles at a maximum of expedition and economy, and also to effect the stowage of the material, during transportation, under conditions that will not only prevent damage or impairment of the articles by bruising, crushing, premature ripening, or other causes, but also to preserve and maintain the goods in the condition as originally stowed, and, in some instances, as when salt water is employed as the immersing medium for certain fruits, to definitely improve the quality and condition of the goods in respect of flavor and capacity to resist the attacks of germs, ferments, and the like, thereby reducing loss due to handling and transportation to a minimum. To these ends the invention includes the construction of the transporting vehicle, preferably a floating vessel or boat, with one or more tanks, holds, or compartments, each containing a body of water, preferably salt water, and associating with the compartments, means, by preference a conduit, for charging or delivering the articles into the respective compartments, in bulk, until the articles are substantially submerged in the water therein and a corresponding volume of water is displaced, then moving the vessel to the desired destination and, finally, discharging the articles from the various compartments, preferably through an auxiliary conduit, by means of additional water supplied to the individual compartments to raise the water level therein sufficiently to float the articles into the conduit or carry the articles into the conduit by the current set up by the additional water supply, which serves to entrain and carry the articles through the conduit and any extensions of the latter to the ultimate destination or point of discharge.

Means for carrying out the invention are illustrated in the accompanying drawings, in which:

Fig. 1 is a plan of a boat or barge equipped with multiple holds or compartments, having superposed flumes and longitudinal charging and discharging conduits communicating with the several compartments;

Fig. 2 is a partial side elevation partly in section, including an extension of the flume to the shore or dock;

Fig. 3 is a fragmentary sectional side elevation showing certain structural details and arrangements of parts;

Fig. 4 is a partial transverse sectional elevation;

Fig. 5 is a fragmentary plan view of a modified form of the invention, including closed conduits and ancillary devices for loading and unloading the individual compartments;

Fig. 6 is fragmentary side elevation partly in section of the apparatus shown in Fig. 5.

Fig. 7 is a partial transverse sectional elevation;

Fig. 8 is a partial transverse sectional elevation of another modification showing a closed charging conduit and open discharging conduits or flumes.

Figs. 9 and 10 are enlarged detail views of the mechanism for raising and lowering the false bottom of each hold or compartment.

Referring to Figures 1 to 4 of the drawings, 1 indicates the hull of a suitable boat, barge, or vessel, which may be provided with means for propelling the same through the water, or, if desired, may be designed to be towed, as will be understood. The hull is provided with the usual deck 2, side rails or coaming 3, and scuppers 4, the latter admitting of the ready discharge of water from the deck.

Formed within the body of the hull is a series of holds, or compartments 10, comprising side walls and bottom sections, which may be made of any suitable material. Each of the compartments 10 preferably extends above the deck level, the extension 11 constituting a coaming 11, which may, if desired, be provided with a removable hatch cover 18. Preferably, the coaming 11 of each compartment is provided with an opening 12, which serves to determine the water level in the compartment and permit any excess water to flow out of the compartment.

Each opening or port 12 is provided with a hinged closure or stopper 13 and a sliding screen 14, the purpose of which will be disclosed later.

As indicated, the holds or compartments are arranged in two contiguous parallel rows extending fore and aft, so that a single longitudinal partition or bulkhead will separate the two rows, and likewise, a single partition or bulkhead will separate the individual compartments. This arrangement provides for a relatively large number of holds or compartments, economically disposed to afford a maximum stowage space and to admit of the holds or compartments being loaded or emptied in any desired order or sequence to maintain the proper trim of the vessel.

Running longitudinally of the vessel, overlying the several compartments and preferably transecting the upper marginal edges of the walls or bulkheads of the various compartments is a flume 15, conveniently constructed with a V-shaped bottom and vertical sides, the flume being provided at intervals with lateral openings 16 to establish communication between the flume and the respective holds or compartments, each of the openings being controlled and regulated by means of a suitable gate or slide 17, the several openings and slides being preferably arranged in staggered relation throughout the length of the flume, as illustrated in Fig. 1. Located at the deck level on each side of the vessel are discharge flumes 20, each adapted to be connected with the upper portions of the holds or compartments on that particular side by way of the ports or openings 12, when the corresponding stoppers 13 are swung to open position. Each of the flumes 20, 20 extends from the forward holds or compartments to the stern of the vessel, where the flume sections are adapted to be coupled up with extension flume sections leading from the vessel's stern to the discharging point, where the same may be. Similarly, the loading or charging flume 15 is adapted to be connected with the shore, dock or other cargo loading point, by means of extension sections 15ˣ of the flume.

Each hold or compartment is provided with a false bottom or platform 40, preferably made of slat work, which is raised and lowered by rack bars 41 extending upward through the hold or compartment, each engaged by a pinion 42, fast upon a series of drive shafts 43, 44 and 45, mounted in brackets 46, 47, 48 and 49 disposed on or about the hatch coaming of the compartment, said shafts being operated by sets of bevel gears 50, 50, one of the shafts, as 44, being provided with a large pinion 51, which is engaged by a spur gear 52 journalled in bracket 47 and operated by a hand crank 53, or other suitable driving means, as more particularly illustrated in Figs. 5, 9 and 10.

Located in the upper portion of each hold or compartment is a jetting device or manifold 60 connected by a branch valved pipe 61 with a supply pipe 62, adapted to supply water under relatively high pressure to direct strong jets or currents of water across the hold towards the discharge port 12.

As indicated, the cargo vessel is designed particularly for transporting fruits and similar goods in bulk, and is especially adapted for handling and transporting pineapples, which are grown in tropical sections and on relatively high ground, remote from loading points, and, therefore, required to be harvested, packed in boxes, and transported by trucks, tramways, or other conveyances to the point of loading, where it has been customary to stow the boxed fruit in the holds of vessels or similar cargo carriers, when the plantations are separated from the factories or other destinations of the fruit by water. Heretofore, the handling and transporting of goods of this character have been difficult and expensive, not only in respect of the labor required, but in the loss of fruit due to damage in transit and also to the tendency of the fruit to overheat and ripen prematurely when stowed in the holds of vessels or in closed cars.

According to the instant invention, the fruit is charged directly into the holds or compartments of the vessel, said holds or compartments containing a body of water, preferably sea water, in the case of certain fruits or the like, until each compartment is practically filled with the fruit and water, the latter substantially immersing the entire bulk of fruit in each hold or compartment. In delivering the fruit to the various compartments, the fruit is brought into proximity to the loading point and dumped either directly into the flume or conduit 15', forming an extension or continuation of the flume 15, or onto a suitable conveyor leading to such flume, the flume being supplied with a sufficient quantity of water to transport the fruit delivered thereto directly to the boat or barge, where the fruit is directed into a selected hold or compartment by opening up the gate or slide 17 controlling the opening 16 between the flume and the corresponding hold or compartment, and the volume of water equal to that of the fruit is displaced. The fruit and water traversing the flume are both discharged into the selected hold and the excess water permitted to escape, by opening the valve or stopper 13, permitting the water to flow out by way of the port 12 in the coaming 11 about the upper edge of the hold or compartment, into the lateral flume 20 and escaping overboard by way of the open end of said flume. It will be understood that the screen or grating 14 is moved over the port 12 to prevent the escape of the fruit that is light enough to float, with the water. Preferably, the discharge port 12 is made much larger than the charging opening 16 in the float-conduit, so that the lodgment of the floating fruit against the screen 14 will not prevent the escape of the excess water displaced by the mixture of fruit and water charged into the hold by flume 15. It will be understood that each hold or compartment 10 is filled with water preparatory to charging the fruit therein, and, as the fruit and water from the charging flume 15 enter said hold, a like volume of water is displaced and forced out by way of port 12 into flume 20, and thence overboard. The fruit passing directly from flume 15 into the body of water in the hold is not damaged by impact with the walls or bottom of the hold or with fruit already stowed, but, on the contrary, sinks quietly in the water in the hold, if said fruit is heavier than the water of immersion, or floats, if it is lighter than the water, until it is submerged by the following elements of fruit. In any event, the specific gravity of the fruit varying very little from that of the water in the hold, all or substantially all of the weight of the fruit is sustained by the buoyant effect of the water and the entire hold may be filled with fruit and water without imposing damaging pressures or stresses on any of the fruit. It will also be noted that each fruit delivered to a given hold 10 displaces a corresponding volume of water therefrom, so that the method of loading, as applied to fruits and similar goods, or commodities involves the displacement of a volume of water from the receiving hold equal to the whole volume of the fruit delivered thereto, and, when the loading operation has been completed, each hold or compartment will contain a full load of fruit immersed in and substantially sustained by the water in said compartment. When a given hold or compartment has been completely filled with water and with fruit in bulk, then the gate or slide 17 is closed, and the hold is sealed by means of the hatch cover 18, and by closing the overflow opening 12 by means of stopper 13. The other holds are similarly filled with water and fruit by opening up the appropriate gates or slides 17, successively, until the entire cargo has been stowed. The water supplied to the shore sections of the flume may be taken directly from the sea or from the stream in which the transporting vessel floats, or from any other suitable source. By using water as the conveying medium for the fruit and also as the medium in which the fruit is substantially completely submerged in the various holds or compartments, manifold advantages are realized, among which may be mentioned the facility with which the fruit is transported from the initial flume section into the hold without danger of bruising or otherwise damaging the fruit, as the latter is carried along by the current of water and deposited directly into the body of water in the compartment, said body of water always being maintained at a sufficient depth to afford a complete immersion of the fruit, the surplus water being displaced and forced automatically out of the hold as the fruit is delivered to the latter, as hereinbefore explained. Furthermore, it has been found that the immersion of the fruit in a body of water contained within the individual holds or compartments prevents the crushing of the fruit in the lower part of the hold by the superposed bulk of fruit, as, in most instances, the fruit is either only slightly lighter or slightly heavier than the corresponding body of water which it displaces, so that either the whole or the greater proportion of the weight of the fruit will be sustained by the immersing water. Again, the immersion of the fruit in the water prevents undue heating of the fruit, and also excludes all germs and fermenting agencies which might tend to impair the fruit during transportation. A further advantage is predicated upon the fact that, if sea water or water containing an amount of salt approximating that of sea water, be employed, the latter not only serves to preserve the fruit, but also adds just a sufficient salty flavor thereto to render the same preferable to fresh fruit.

When it is desired to discharge the fruit, after the vessel has reached its ultimate destination, if the fruit is of a specific gravity less than of the water, and therefore tends to float in the water, it is necessary only to elevate the screen 14 and open the stopper 13 of a given hold or compartment to be emptied and then open the gate or slide 17 to establish communication between the particular hold or compartment and the flume 15 and supply the flume with water from overside, or other appropriate source. If the fruit is of less specific gravity than the water, it will float thereon and be carried by the current set up across the surface through the port 12 into flume 20, along the latter to connecting auxiliary flume sections to the point of ultimate delivery. If, however, the fruit is heavier than the water of submergence and therefore does not float therein, the false bottom of the hold 10 is slowly elevated by the gearing cooperating with the rack bars 41 to bring the successive layers or strata of fruit into the cross current of water from flume 15 to and through port 12, so that the fruit will be carried into flume 20. In order to prevent clogging of fruit, as the latter is gradually elevated by the false bottom, strong jets of water from the manifold 60 may be directed towards the port 12, which will force the fruit through the port and also prevent the fruit lodging and accumulating in the corners of the hold.

The particular embodiment of the invention, as herein before described, is applicable in the loading and unloading of vessels in relatively quiet harbors or water ways, where the transporting vessel is not subject to rolling or pitching, but can be maintained upon a substantially even keel during both the loading and unloading operations. Obviously, however, these favorable conditions are not present in all cases, and it is frequently found necessary to effect either the loading or the unloading operation, or both operations, while the vessel is subjected to the action of the waves which will cause an undue rolling or pitching, which will materially effect the loading or unloading, if open flumes be employed, for the reason that it will be impossible to maintain a uniform flow of water in either of the flumes so that the charging or discharging of the fruit will be seriously affected, even if it be carried out at all. To meet these particular conditions and to adapt the invention for general and successful operation in all types of harbors and water ways, especially those in which rough water is encountered, the particular modifications of the invention shown in Figs. 5 to 8 may be employed, the first modification shown in Figs. 5, 6 and 7 being applicable to vessels operating in rough water at both the loading and unloading points, and the modification shown in Fig. 8 being applicable to a vessel where the loading is to be effected in rough water and the unloading in relatively smooth or calm water.

Referring to Figs. 5, 6 and 7, it will be noted that the only material changes in the construction of the transporting vessel and its accessories reside in the mode of construction and operation of the loading and unloading conduits, the latter, instead of being open flumes as in the preceding case, take the form of closed pipes or conduits, which are adapted to be connected up to suitable extension conduits at the shore end of the vessel and at the loading or unloading stations.

In lieu of the open flume 15, the vessel is provided with a closed pipe 15', of suitable dimensions, which extends longitudinally of the vessel, substantially amidship or over the bulkhead separating the two rows of holds or compartments, the said conduit 15' being provided with outlet sections 16', one opening into each hold, communication between the interior of the conduit and the discharge section being controlled by a suitable slide 17', which may be conveniently formed to operate in guideways within the flange connections by means of which the outlet sections 16' are connected to the body of the conduit. The outlets 16' are preferably arranged in staggered relation and are inclined, as shown, to discharge the water and fruit into the holds in much the same manner as the outlets 16 of the open flume of the first described modification. It will noted that this particular arrangement of closed conduit, outlet pipe sections and sliding gates or valves provides a substantially smooth interior for the conduit 15', which will facilitate the movement of the water and the fruit in the latter and prevent clogging. Under certain conditions, it may be found desirable to provide the conduit 15' with a bore which gradually increases from the charging end, which will also reduce the tendency of the fruit to jam in the conduit and will admit of any jams which do form being readily relieved. In order to maintain a strong current of water and fruit in the conduit 15', the latter is fitted with a jetting device comprising a supply pipe 70 mounted above and running parallel with the conduit and coupled to the latter at intervals by inclined jetting nozzles 71, opening into the interior of the conduit and provided with valved connections 72 with the pipe 70, so that any one or more of the jetting nozzles may be coupled up to direct relatively powerful jets of water into the conduit in the direction of movement of the water and fruit therein.

The apparatus for effecting the unloading of the individual holds or compartments comprises closed conduits 20' disposed on the outside of the holds and extending along the deck 2 fore and aft, for the full length of the hold sections and to the discharge end of the boat, where the end of each conduit 20' is adapted to be coupled with an auxiliary conduit leading to the place of ultimate discharge of the cargo. Each conduit 20' is connected with the several holds on the corresponding side of the boat, by means of short pipe sections 12' opening into the hold, each pipe section being adapted to be closed by means of a sliding gate 13', and also being fitted with a sliding screen or grating 14', which elements serve the same purpose and function as the stoppers 13 and the screens or gratings 14 in the preceding modification. This form of the apparatus, as a rule, will require the application of relatively powerful water jets directed transversely of the top of the hold and toward the outlet 12' to force the fruit toward and into said outlet and prevent the fruit lodging in the corners of the hold when the bulk of the fruit is lifted by the false bottom of the hold. The jetting apparatus, which is similar to that shown in the preceding modification, is preferably located as close to the midship bulkhead of the corresponding hold as feasible, so that the water jets delivered by the nozzles of the manifold 60 will be directed over substantially the entire upper area of the hold at or about the water level therein, so as to assure the dislodgment of any fruit which may have been trapped in the corners. In order to assure the proper discharge of the fruit from the individual holds, especially if some of the fruit has become lodged above the water line and out of the normal current of water flowing from conduit 15', the false bottom may be lowered to a slight extent to submerge the obstructed fruit and permit the same to be acted upon by the water flowing from the conduit 15' and the water jets delivered by the manifold 60. In fact, by alternately raising and lowering the false bottom slightly, a practically regular and uniform discharge of the fruit from any particular hold may be readily effected.

In order to provide for ready inspection of the charging operation, the conduit 15' is provided with glass-covered sight openings 18' at regular intervals and, if necessary, by removing the securing rims about these openings, access to the interior of the conduit may be had for the purpose of dislodging any fruit which may become jammed in the conduit.

The operation of this particular form of the invention will be apparent from the foregoing description. It will be understood that in the loading operation the conduit 15' is coupled up with a conduit section on the shore or dock, the extension conduit connecting with a tank or reservoir, into which the fruit and the requisite amount of water is supplied, so that the admixture of fruit and water will flow into the conduit 15' and thence out of the latter into the appropriate hold or holds, with which communication has been established by opening the sliding gate or gates 17'. During the charging operation, the gate 13' of the hold being charged is opened and the screen or grating 14' lowered over the opening 12' to permit the excess water to flow out of the hold into the conduit 20', and at the same time, prevent any of the fruit passing out with the excess water. If the rolling action of the boat, during the charging operation, is excessive, it will be necessary to operate the water jets 71, which, by reason of the heavy pressure of water supplied by the pipe 70, exercise a powerful ejector-like action on the body of water and fruit in the conduit 15' and force the same along the conduit until it reaches the open discharge outlet 16', thereby insuring a practically uniform charging of the fruit into the proper hold. It will be understood that each of the holds is preliminarily filled with water so that the fruit discharged from the conduit 15' into the holds is delivered therein without shocks or jars and is permitted to either settle toward the lower part of the hold, or to float in the water until submerged by the weight of the succeeding elements of the fruit. When a given hold has been completely charged with the fruit and water, the corresponding gates 17' and 13' are closed, so that the entire body of fruit charged into the hold will be completely submerged in the water, the relative proportions of fruit and water in a completely charged hold being about 45% to 50% of fruit and 55% to 50% of water.

When all of the holds have been charged or completely loaded with fruit submerged in water and the vessel has been transported to the place where the cargo is to be discharged, the same operations are carried out as in the preceding case, that is to say, the gates 13' in opposite holds or compartments are opened and the gratings or screens 14' raised to uncover the outlets 12' and the corresponding gates 17', controlling the outlet 16' of the conduit 15', are opened and water forced into the conduit 15' from any appropriate source. This water, entering the corresponding holds through the discharge outlets 16', sets up a current across the holds toward the outlets 12' and carries the upper stratum of fruit and water in the corresponding holds into the discharge conduits 20'. In case any of the fruit is not submerged and therefore cannot be moved by the transverse water currents, the jetting device 60 is brought into operation and the powerful jets delivered by the nozzles thereof will be effective in forcing the fruit toward and through the discharge opening 12' into the conduit 20'. Likewise, any fruit that may be lodged in the corners of the hold will be swept out by these jets. The discharge ends of the conduits 20' are appropriately connected with extension conduits leading to the point where the fruit is to be delivered, and by making the connection, between the said conduits 20' and the sections of the conduit on shore, flexible, it will be apparent that the loading operation may be carried out effectively and uniformly, even though the vessel is rolling or pitching in the rough water of an unfavorable unloading point.

It frequently happens that the conditions of the water way at the loading point may be unfavorable, because of the roughness of the water, and the conditions at the unloading point entirely favorable with a calm harbor and good docking facilities. Under such conditions, the construction and arrangement shown in Fig. 8 may be adopted in which the charging end of the apparatus is similar to that shown in Figs. 5, 6 and 7, while the discharge of the cargo may be effected through open flumes 20 similar to that shown in the first modification, as exemplified in Figs. 1 to 4. Should the conditions be reversed, namely, with a smooth harbor at the loading port and a turbulent waterway at the unloading point, the arrangement shown in Fig. 8 may be reversed, namely, the charging conduit may be an open flume similar to 15 shown in Figs. 1 to 4, while the discharging conduits and the connections between the same and the hold will be similar to the construction shown in Figs. 5 to 7.

In all of the particular exemplifications of the invention, it will be understood that the holds or compartments are first filled with water, and the fruit, or other articles to be transported, is discharged into the individual holds in regular predetermined order, in the manner described, being delivered into the holds by the water flowing in the open flumes, or conduits, as the case may be, so that the charging body of water and fruit displaces a like volume of water in each hold, which displaced body of water is permitted to flow off through the discharge flume or conduit and thence overboard. After the entire cargo has been charged into the holds, each of the latter will be completely filled with an admixture of water and fruit, the latter being submerged in the water, so that all, or a relatively large proportion of the weight of the fruit is supported by the water of immersion, with the resultant advantages hereinbefore more particularly set forth.

What I claim is:

1. The method of storing and transporting fruit and the like, which comprises delivering and immersing the same within a body of water carried by the transporting vehicle and simultaneously displacing a volume of water from said vehicle equal to that of the commodities, and moving the vehicle to the desired destination.

2. The method of storing and transporting fruit and the like, which comprises delivering and immersing the same within a body of salt water carried by the transporting vehicle and simultaneously displacing a volume of water from said vehicle equal to that of the commodities, and moving the vehicle to the desired destination.

3. The method of storing and transporting fruit and the like, which comprises delivering and immersing the same within a body of sea water carried by the transporting vehicle and simultaneously displacing a volume of water from said vehicle equal to that of the commodities, and moving the vehicle to the desired destination.

4. The method of storing and transporting fruit and the like, which comprises delivering and immersing the same within a body of water confined within a compartment of a marine vessel and simultaneously displacing a volume of water from said compartment equal to that of the commodities, and moving the vessel to the desired destination.

5. The method of storing and transporting fruit and the like, which comprises supplying a compartment of a transporting vessel with a body of water, charging the articles into the compartment until all of said articles are substantially immersed in the water therein and a corresponding volume of water has been displaced from said compartment, and moving the vessel to the desired destination.

6. The method of storing and transporting fruit and the like, which comprises supplying a compartment of a transporting vessel with a body of salt water, charging the articles into the compartment until all of said articles are substantially immersed in the water therein and a corresponding volume of water has been displaced from said compartment, and moving the vessel to the desired destination.

7. The method of storing and transporting fruit and the like, which comprises supplying a compartment of a transporting vessel with a body of sea water, charging the articles into the compartment until all of said articles are substantially immersed in the water therein and a corresponding volume of water has been displaced from said compartment, and moving the vessel to the desired destination.

8. The method of storing and transporting fruit and the like, which comprises supplying a compartment of a transporting vessel with a body of water, conveying the articles to and charging the same into said compartment by a body of water flowing in a suitable conduit until all of said articles are substantially immersed in the water therein, and moving the vessel to the desired destination.

9. The method of handling, storing and transporting fruit and the like, which comprises supplying a compartment of a transporting vessel with a body of water, charging the articles into the compartment until all of said articles are substantially immersed in the water therein, moving the vessel to the desired destination, and discharging the articles from said compartment by supplying the latter with an additional amount of mobile water to carry the articles out of said compartment.

10. The method of handling, storing and transporting fruit and the like, which comprises supplying a compartment of a transporting vessel with a body of water, conveying the articles to and charging the same into said compartment by a body of water flowing in a suitable conduit communicating with said compartment until all of said articles are substantially immersed in the water therein, moving the vessel to the desired destination, and discharging the articles from the upper portion of said compartments by supplying the compartment with an additional amount of water to move the articles from the compartment into a discharging conduit.

11. The method of loading, storing, transporting and unloading fruit and the like, which comprises filling a storage compartment of a transporting vessel with water, conveying the articles to and charging the same into said compartment thereby displacing a corresponding volume of water from said compartment and immersing the articles in the residual body of water, moving the vessel to the desired destination, and discharging the articles from said compartment by supplying the latter with an additional amount of water.

12. The method of handling and transporting fruit and the like, which comprises entraining and conveying the articles by a water current into one or more holds of a vessel which holds are preliminarily filled with water, moving the vessel to the desired destination with its cargo of articles submerged in the water contained in said hold or holds, and discharging the articles from the hold or holds by supplying the latter with an additional quantity of flowing water.

13. The method of handling and transporting fruit and the like, which comprises entraining and conveying the articles by a water current into one or more holds of a vessel which holds are preliminarily filled with water, moving the vessel to the desired destination with its cargo of articles submerged in the water contained in said hold or holds, discharging the articles from the hold or holds by supplying the latter with hold or holds by supplying the latter with an additional quantity of flowing water, and gradually elevating the stowed articles in bulk toward the place of discharge.

14. A cargo vessel having one or more compartments each containing a body of water, means for charging fruit or similar articles into the water-containing compartment or compartments until all of said articles are substantially submerged, and a valve controlled discharge outlet near the top of each compartment for discharging the articles from the latter upon supplying additional water to said compartment or compartments.

15. A cargo vessel having one or more compartments each containing a body of water, a conduit having openings communicating with the respective compartments for charging fruit or like articles into said water-containing compartments, and a valve controlled outlet for each compartment for discharging the articles from said compartments upon supplying additional water thereto.

16. A cargo vessel having one or more compartments each containing a body of water, a conduit having openings communicating with the respective compartments for charging fruit or like articles into said water-containing compartments, and a valve controlled outlet for each compartment near the top thereof for discharging the articles from said compartments upon supplying additional water thereto.

17. A cargo vessel having one or more compartments each containing a body of water, a conduit having openings communicating with the respective compartments near the top thereof for charging fruit or like articles into said water-containing compartments, and a valve controlled outlet for each compartment near the top thereof for discharging the articles from said compartments upon supplying additional water thereto.

18. A cargo vessel having one or more compartments each containing a body of water, a conduit having openings communicating with the respective compartments for charging fruit or like articles into said water-containing compartments, a false bottom for each compartment, and means for elevating each false bottom and the articles thereon to facilitate the discharge of said articles from the top of the compartment.

19. A cargo vessel having a series of compartments each containing a body of water, a conduit overlying said compartments and having openings communicating with the respective compartments, for charging fruit and the like into said water-containing compartments, and a second conduit having valve-controlled connections with each compartment near the top thereof to discharge the articles from the respective compartments upon supplying the latter with additional water.

20. A cargo vessel having a series of compartments each containing a body of water, a conduit overlying said compartments and having openings communicating with the respective compartments, for charging fruit and the like into said water-containing compartments, a second conduit having valve-controlled connections with each compartment near the top thereof to discharge the articles from the respective compartments upon supplying the latter with additional water, a false bottom for each compartment, and means for elevating each false bottom and the articles thereon to facilitate the discharge of said articles.

21. A cargo vessel having a series of water-tight holds each adapted to contain a body of water substantially filling the same, a hydraulic conveyor conduit having outlets communicating with the respective holds near the top thereof for charging articles and water into said holds, and a second hydraulic conveyor conduit having valve-controlled connections with the respective holds near the top thereof to receive the articles discharged from the holds by an additional supply of water from the first conduit.

22. A cargo vessel having a series of water-tight holds each adapted to contain a body of water substantially filling the same, a hydraulic conveyor conduit having outlets communicating with the respective holds near the top thereof for charging articles and water into said holds, a second hydraulic conveyor conduit having valve-controlled connections with the respective holds near the top thereof to receive the articles discharged from the holds by an additional supply of water from the first conduit, a false bottom for each compartment, and means for elevating each false bottom and the articles thereon to facilitate the discharge of said articles.

23. A cargo vessel having a series of water-tight holds each adapted to contain a body of water substantially filling the same, a hydraulic conveyor conduit having outlets communicating with the respective holds near the top thereof for charging articles and water into said holds, a second hydraulic conveyor conduit having valve controlled connections with the respective holds near the top thereof to receive the articles discharged from the holds by an additional supply of water from the first conduit, and means for directing hydraulic jets transversely of the holds toward the outlets to the second conveyor.

24. A cargo vessel having a series of water-tight holds each adapted to contain a body of water substantially filling the same, a hydraulic conveyor conduit having outlets communicating with the respective holds near the top thereof for charging articles and water into said holds, a second hydraulic conveyor conduit having valve-controlled connections with the respective holds near the top thereof to receive the articles discharged from the holds by an additional supply of water from the first conduit, means for directing hydraulic jets transversely of the holds toward the outlets to the second conveyor, a false bottom for each compartment, and means for elevating each false bottom and the articles thereon to facilitate the discharge of said articles.

In testimony whereof I affix my signature.

SIMES T. HOYT.